(12) United States Patent
Andersson

(10) Patent No.: US 9,505,152 B2
(45) Date of Patent: *Nov. 29, 2016

(54) METHOD AND DEVICE FOR PRODUCING A DRAINAGE ELEMENT AND DRAINAGE ELEMENT PRODUCED THEREBY

(71) Applicant: Isodrän AB, Haninge (SE)

(72) Inventor: Jan Andersson, Ingarö (SE)

(73) Assignee: MDT MARK O DRÄNERINGSTEKNIK HOLDING AKTIEBOLAG, SkogÅs (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,845

(22) Filed: Nov. 17, 2015

(65) Prior Publication Data

US 2016/0067892 A1  Mar. 10, 2016

Related U.S. Application Data

(63) Continuation of application No. 13/576,643, filed as application No. PCT/SE2011/050130 on Feb. 4, 2011, now Pat. No. 9,205,620.

(30) Foreign Application Priority Data

Feb. 5, 2010 (SE) ...................................... 1050117

(51) Int. Cl.
*B29C 39/04* (2006.01)
*B29C 43/02* (2006.01)
(Continued)

(52) U.S. Cl.
CPC ............... *B29C 43/02* (2013.01); *B29C 43/34* (2013.01); *B29C 43/361* (2013.01); *B29C 44/02* (2013.01); *B29C 44/388* (2013.01);
(Continued)

(58) Field of Classification Search
CPC .. B29C 44/388; B29C 43/361; B30B 15/304
USPC ........ 264/109, 119, 120, 128; 425/425, 426, 425/428, 429, 430, 431, 375, 344, 345
See application file for complete search history.

(56) References Cited

U.S. PATENT DOCUMENTS

| 1,548,474 A | 8/1925 | Miller |
| 2,494,212 A | 1/1950 | Spriggs et al. |

(Continued)

OTHER PUBLICATIONS

Non Final Office Action received for U.S. Appl. No. 13/576,643, mailed on May 21, 2015, 6 pages.
International Preliminary Report on Patentability received for PCT Patent Application No. PCT/SE2011/050130 mailed on Aug. 16, 2012, 6 pages.

(Continued)

*Primary Examiner* — Timothy Kennedy
(74) *Attorney, Agent, or Firm* — Morrison & Foerster LLP

(57) ABSTRACT

A porous hardenable drainage element is produced from a molding compound of expanded plastics granulate and a bonding agent by virtue of the fact that the molding compound is received in a ladle having a pouring opening closed off by a mold bottom, the molding compound is pressurized in the ladle, the element is molded from the molding compound in a mold formed by lowering of the mold bottom down into an opening cross section consistent with a cross section of the pouring opening, and the element is separated from the molding compound by mutual lateral displacement of the mold and the ladle.

8 Claims, 4 Drawing Sheets

(51) Int. Cl.
*B29C 43/36* (2006.01)
*B30B 15/30* (2006.01)
*B29C 44/38* (2006.01)
*B29C 43/34* (2006.01)
*B29C 44/02* (2006.01)
*B29K 105/04* (2006.01)
*B29K 105/00* (2006.01)
*B29L 31/10* (2006.01)

(52) U.S. Cl.
CPC .... *B30B 15/304* (2013.01); *B29C 2043/3488* (2013.01); *B29K 2105/045* (2013.01); *B29K 2105/251* (2013.01); *B29L 2031/104* (2013.01)

(56) References Cited

U.S. PATENT DOCUMENTS

| | | |
|---|---|---|
| 4,164,537 A | 8/1979 | Drostholm et al. |
| 4,201,530 A | 5/1980 | Vogt |
| 4,478,567 A | 10/1984 | Schaer |
| 5,740,638 A | 4/1998 | Shepherd, III |
| 2009/0080976 A1 | 3/2009 | Anderlind et al. |

OTHER PUBLICATIONS

International Search Report and Written Opinion received for PCT Patent Application No. PCT/SE2011/050130, mailed on May 20, 2011, 8 pages.

METHOD AND DEVICE FOR PRODUCING A DRAINAGE ELEMENT AND DRAINAGE ELEMENT PRODUCED THEREBY

CROSS-REFERENCE TO RELATED APPLICATIONS

This application is a continuation application of U.S. patent application Ser. No. 13/576,643, filed Oct. 11, 2012, which is a U.S. National Stage patent application of PCT/SE2011/050130, filed on Feb. 4, 2011, which claims priority to Swedish Patent Application No. 1050117-9, filed on Feb. 5, 2010, each of which is hereby incorporated by reference in the present disclosure in its entirety.

FIELD OF THE INVENTION

The invention relates to a method and a device for producing a porous hardenable drainage element from a molding compound of expanded plastics granulate and a bonding agent. The invention also relates to a drainage element produced by such a method and such a device.

BACKGROUND OF THE INVENTION

Drainage elements or slabs of this kind are often not only draining, but also heat-insulating and/or capillary-breaking. They are usually produced by the molding compound being pressurized and dispersed through a nozzle orifice down into passing open face molds, which move in a circulatory path. Once a mold is filled, an accompanying cover is pressed down into the mold to compress the molding compound, so that the spherical granulates adhere to one another to such an extent that the element attains the desired strength. During the compression, the mold and the cover are flowed through by warm air to harden the bonding agent, after which the cover is removed and the drainage element is forced out of the mold with the aid of ejectors in the mold.

One problem with this method is that the expanded pellets of the granulate do not get evenly distributed when the compound is dispersed in the mold, so that in some areas they become less tightly packed, resulting in the formation of cavities in the molding compound. When the elements are then compressed and hardened, the cavities can remain and impair the strength of the element, especially the compressive strength, as is indicated in the appended fig.

In addition, the molds have defined depths, so that only elements of a given thickness can be produced with one and the same device.

SUMMARY OF THE INVENTION

One object of the invention is to provide a method and a device which are capable of distributing the granulates more uniformly in the elements.

Another object is to provide a method and a device which can produce elements of different thickness in a simple manner.

According to one aspect of the invention, the molding compound is received and pressurized in a ladle having a pouring opening closed off by a mold bottom, and the molding compound is poured, by lowering of the mold bottom, down into a mold having an opening cross section consistent with the pouring opening, after which the element having a portion of the molding compound is separated from another portion of the molding compound remaining in the ladle by mutual lateral displacement of the mold and the ladle.

The fact that the molding compound is displaced in this way by lowering of the bottom end of the compound into the mold means that the molding compound does not need to be redistributed inside the mold during the molding, which is the case when a passing mold according to the prior art is filled successively by inflowing molding compound. In the prior art, the pressure of the molding compound reduces when it flows into the empty mold, so that the very light expanded pellets, which stick together by virtue of the sticky bonding agent, do not get a chance to be packed sufficiently tight in the mold due to the low pressure in the mold. By contrast, according to the invention, the whole pressure continues to act on the pouring end of the molding compound throughout the molding process. In other words, therefore, the molding compound has already managed to "settle" into a tightly packed state in the ladle before it is lowered into the mold.

By virtue of the even distribution, an optimal packing or fill factor is obtained, in which, broadly speaking, all granulate pellets have contact with and adhere to one another. As a result, granulate which is more difficult to pack and has more bulk density than earlier can also otherwise be used to obtain the desired or necessary compressive strength of the finished drainage element. In other words, granulate with a greater degree of expansion can then be used in the molding compound in order to economize on plastics raw material, without jeopardizing the strength.

Moreover, the fact that the mold bottom is lowered during the molding allows the thickness of the resulting drainage elements to be easily adjusted by variation of the degree of lowering of the mold bottom along the side walls of the mold.

Although, within the scope of the invention, it is conceivable to strip the mold from the pouring opening by displacement of the mold transversely to the pouring opening, the stripping, in one embodiment of the invention, comprises a lateral displacement of the ladle to a new raised mold bottom for molding of a new element. A plant according to the invention can hence have a plurality of fixed molding stations, situated side by side, between which the ladle can be laterally transferred after each molding operation. This amounts to an appreciable simplification in design terms compared with when the molds move in a circulatory path past the ladle.

In connection with the hardening of the binding agent in the mold, the element can be compressed by placement of a counterstay against the element on the top side of the mold and raising the mold bottom. It is thereby also possible, by varying the raising of the mold bottom, to produce slabs of different degrees of compression, and thus different desired compressive strengths, of the same molding compound. By making use of this variation in compression level, it is possible to save considerable storage and production costs, since granulate with just a few different degrees of expansion is needed for the molding compound. When, according to the prior art, it is wished to change the compressive strength, granulate with a new degree of expansion for each desired strength thus needs to be chosen.

In the compression process, it can also be possible to lower the counterstay to a varying extent in order to obtain a more double-sided compression.

The compression can further be realized by repeated raising and lowering of the mold bottom. Any remaining cavities in the molding compound can hence be removed by the temporary release of any built-up tensions which wedge the pellets in wrong positions, so that the pellets can be allowed to assume their tightly packed positions. Such repeated raising and lowering of the mold bottom can be carried out a necessary number of times in conjunction with successive raising of the mold bottom. It is also possible to make the raising and lowering of the mold bottom occur with high vibrating frequency, at least during a part, for example an initial part, of the compression phase. This can be easily achieved with appropriate control of, for example, hydraulic actuators.

The hardening can be realized with a flow of a heated fluid, such as warm air, through the element. The fluid can flow in a closed system and pass through the element through perforations in the mold bottom and the counterstay. Owing to the closed system, no energy is then leaked to the environment.

The ejection of the element from the mold can be effected by raising the mold bottom to a top surface in a plane coincident with the plane for the pouring opening. The fact that the ejection force thereby acts on the whole bottom face of the element minimizes the risk of the element breaking during the ejection process.

A device according to the invention for producing a porous hardenable drainage element from a molding compound of expanded plastics granulate and a bonding agent comprises a ladle having a pouring opening and displaceable along a plane for the pouring opening, and a mold comprising an opening cross section consistent with a cross section of the pouring opening and a raisable and lowerable mold bottom for lowering of the mold compound from the pouring opening and down into the opening cross section.

The device can have members for pressurizing the mold compound in the ladle, such as propellers.

The device can further have a counterstay for placement against the element at a top side of the mold as the element is compressed in the mold by raising of the mold bottom.

The counterstay and the mold bottom can further be breached by perforations in order to allow a flow of a heated fluid through the element. The element can hence be hardened in connection with the compression.

The device can further have a plurality of stationary molds, located side by side, and members for displacing the ladle between the molds. In such a reverse arrangement compared with the prior art, the molds with their raisable and lowerable mold bottoms are thus stationary and do not need to be transported round in the plant.

Other distinguishing features of the invention can emerge from the patent claims and the following description of illustrative embodiments.

DETAILED DESCRIPTION OF THE INVENTION

Figure 1:
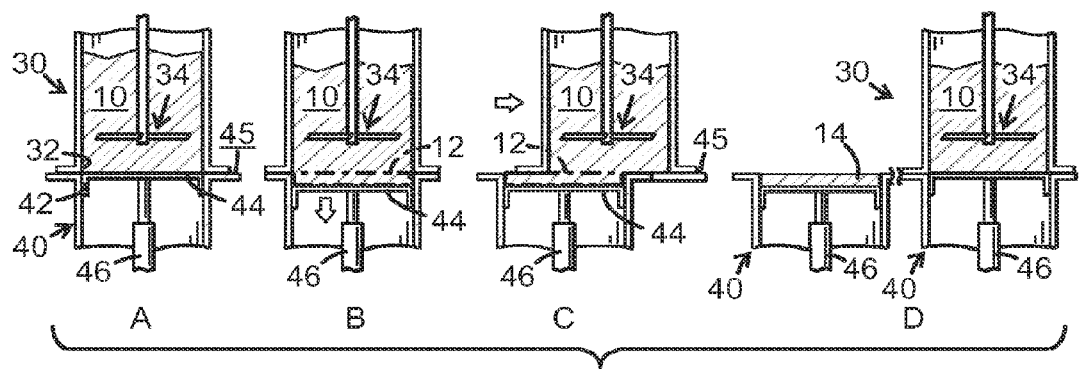
FIG. 1 is a schematic basic view illustrating a device and a method in different stages according to the invention.

In the schematic representation in FIG. 1, different stages for molding of a drainage element 14 from a molding compound 10 consisting of expanded plastics granulate and a bonding agent are shown in basic view. In a first stage A, a molding compound 10 is accommodated in a ladle 30 and is pressurized, for example by one or more propellers (only one is shown in FIG. 1), which can have different height positions in the ladle 30. The ladle 30 has at its lower end a pouring opening 32 having a cross section corresponding to an opening cross section or an upper mold opening 42 of an underlying molding station 40. In the molding station 40 there is a raisable and lowerable mold bottom 44, which is maneuvered by one or more actuators 46 (only one is shown) in the form of, for example, hydraulic cylinders.

In the first stage A, the pouring opening 32 is thus closed off by the mold bottom 44, which lies flush with a support surface 45 for the ladle 30.

In the following stage B, the mold bottom 44 is lowered with the aid of the actuator 46 down into the mold opening 42 by a fraction substantially corresponding to the thickness, prior to the below-described compression, of the resulting drainage element. An end portion 12 of the molding compound 10 is jointly transported down into the mold opening, without being redistributed.

During the next stage C, the ladle 30 is laterally displaced on the support surface 45 for separation or shearing-off of the end portion 12.

In the following step D, a drainage element 14 has been separated. The ladle 30 has then been transferred to a new molding station 40 for molding and separation of a further element in a manner corresponding to that which has been described above.

After this, the drainage element 14 is compressed and hardened in a manner which will later be described in greater detail.

In FIGS. 2-8, a plant 20 having a plurality of mutually adjacent molding stations 40, each having a respective mold opening 42 with a raisable and lowerable mold bottom 44, is shown. The ladle 30 is common to all stations 40 and is displaceable to these with the aid of actuating members in the form of a chain transmission 60 shown by way of example.

Figure 3:
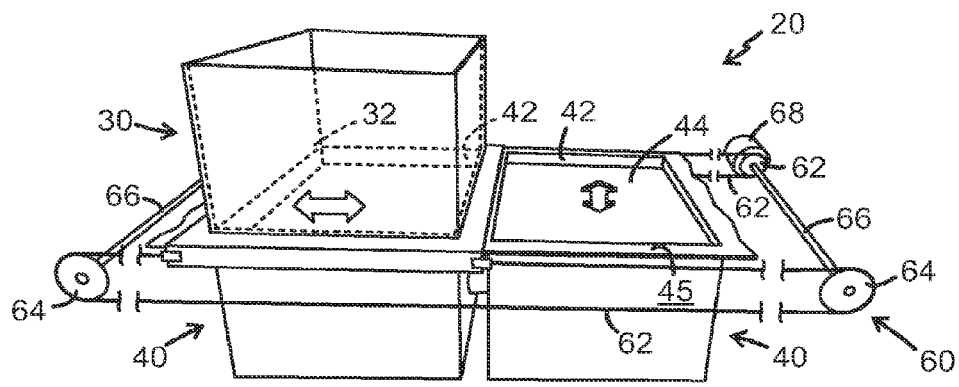
FIG. 3 is a perspective view with broken-off parts of a device according to FIG. 2.
Figure 4:
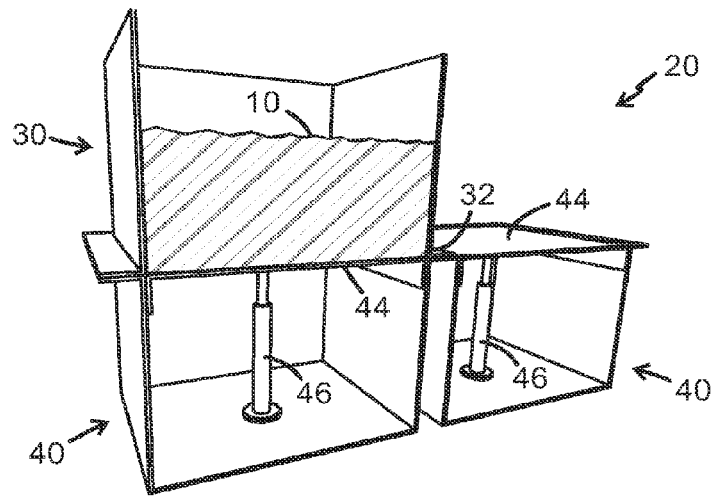
FIGS. 4-8 are perspective views with broken-off parts, showing different stages in a production process of the device according to FIGS. 2 and 3.
Figure 5:
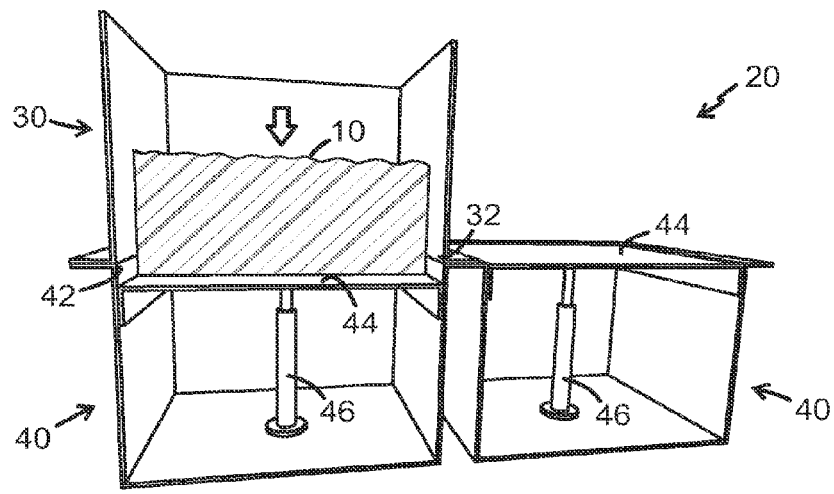
Figure 6:
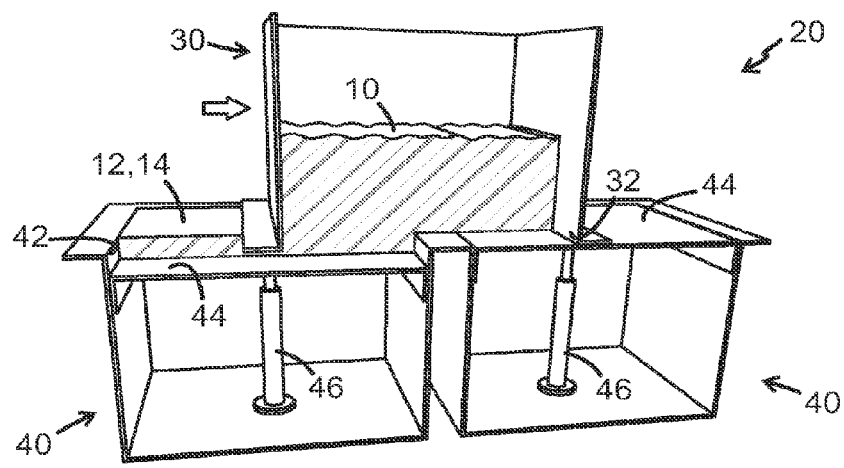
Figure 7:
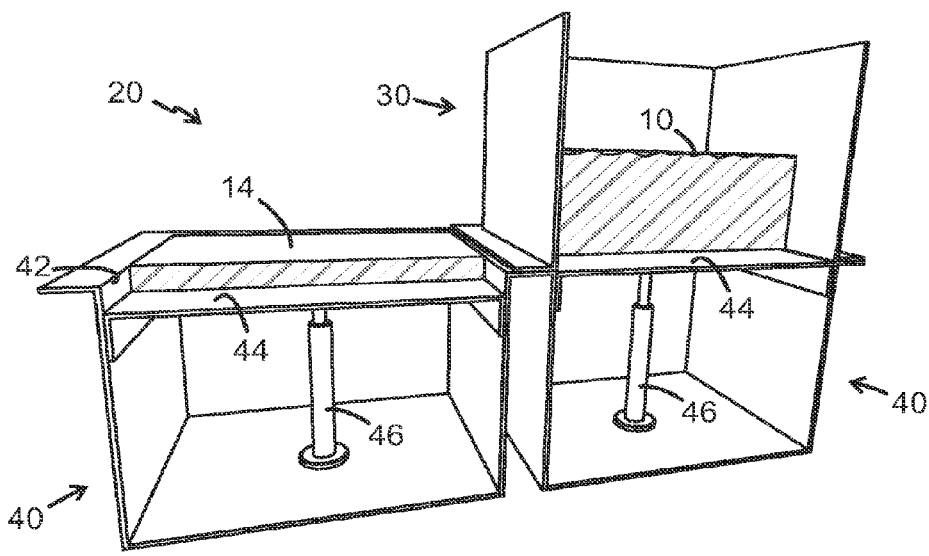

As shown in greater detail in FIG. 3, the chain transmission 60 comprises a pair of chains 62 connected to the ladle 30, which chains, at opposite ends of the plant 20, pass over chain sprockets 64 connected to shafts 66 driven by an electric motor 68. The ladle 30 can be guided in a suitable manner (not shown) along the opposite outer sides of the stations 40.

Figure 2:
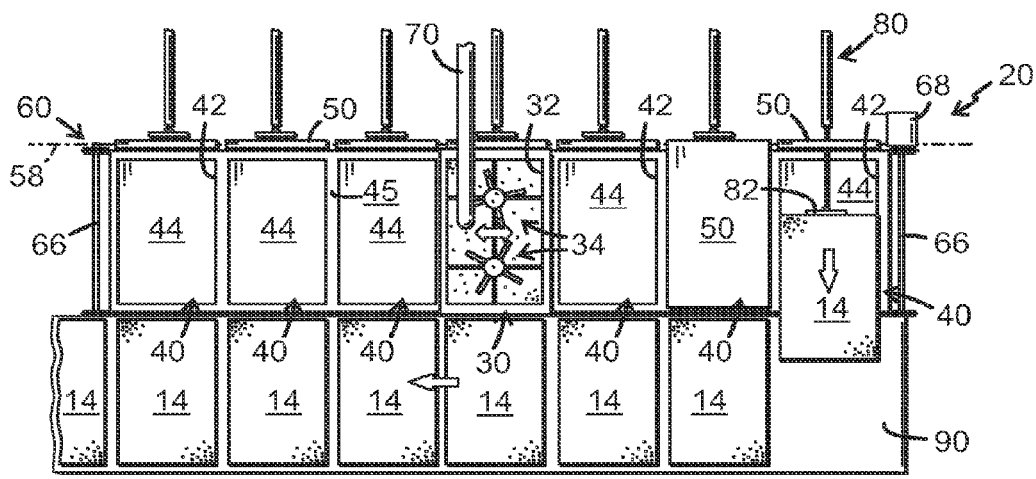
FIG. 2 is a plan view of a device according to the invention.

As can further be seen from FIG. 2, the ladle 30 can have an open top side, through which the molding compound is filled through an inlet tube 70. The molding compound can be remixed and pressurized by abovementioned propellers 34 in the ladle 30. As can be seen, in particular, from FIGS. 4-8, each molding station 40, in other words, can be deemed to have the form of a closed space, which delimits a lower part of a mold channel whose upper part is delimited by the ladle 30. In each station 40, the raisable and lowerable mold bottom 44 is formed by a displaceable slide, piston or plate 44, which can be actuated by the abovementioned one or more actuators (only one is shown in each station) in the form of hydraulic cylinders 46.

Figure 8:
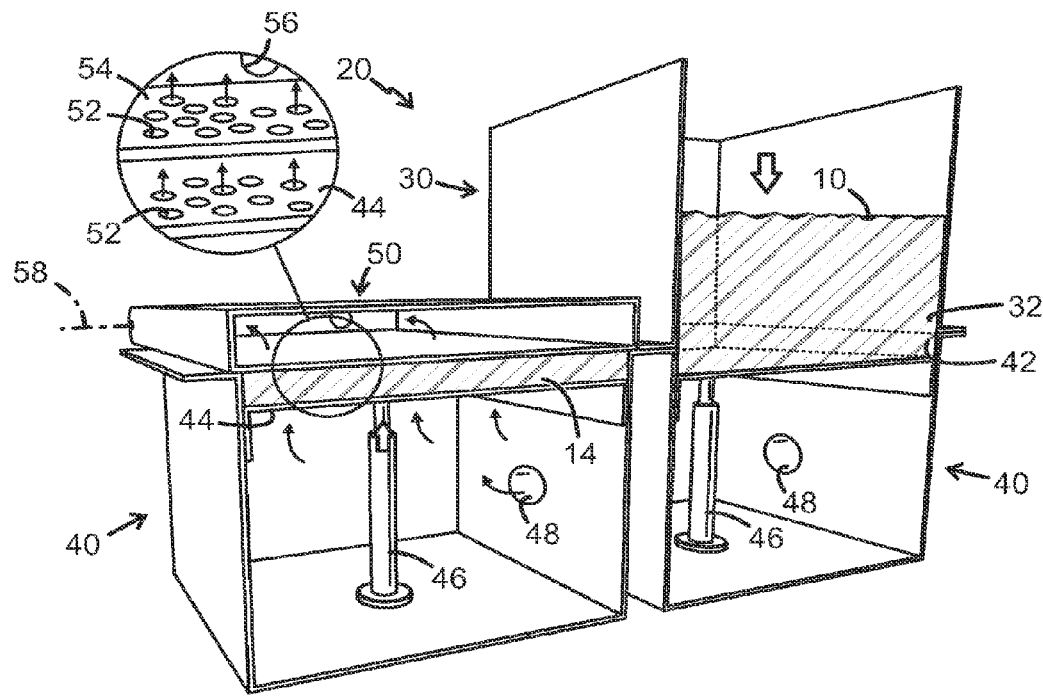

As is indicated in greater detail in FIG. 8, apart from the above-described stages A-D, the elements 14 which have been molded in the plant 20 can also be compressed and hardened in each station 40. For this purpose, each station 40 has a cover 50, which in the shown example delimits an inner cavity and can be swung down about an axis 58 against a just molded element 14. The cover 50 can then form a counterstay for compression of the element 14 with the aid of the actuator 46.

The compression can be effected by repeated raising and lowering of the mold bottom, so any remaining dislocations in the tightly packed structure of expanded pellets can be largely eliminated. As previously mentioned, such repeated raising and lowering of the mold bottom is effected with reduced stroke length in conjunction with successive raising of the mold bottom. It is also possible to make the raising and lowering of the mold bottom occur with a high vibrating frequency, at least during a part, for example an initial part of the compression phase, with a view to vibrating the granulates so that they assume their tightly packed positions. This can be achieved with suitable known control members for the hydraulic cylinders 46.

Figure 9A:
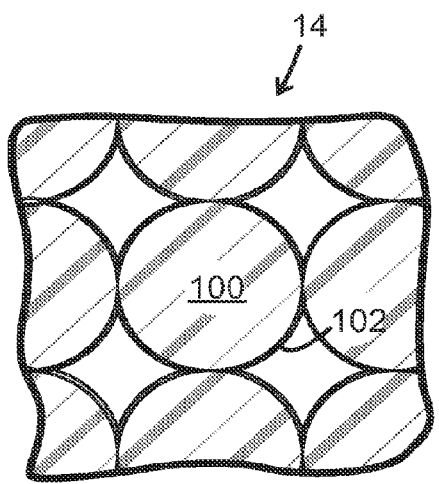
FIGS. 9A and 9B are examples of cross-sectional areas with desired tight packing of expanded granulates of a drainage element according to the invention.
Figure 9B:
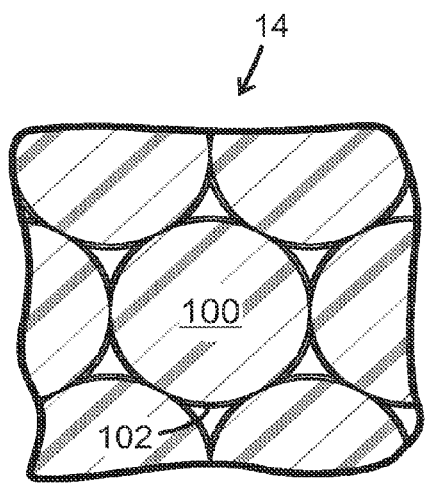
Figure 10:
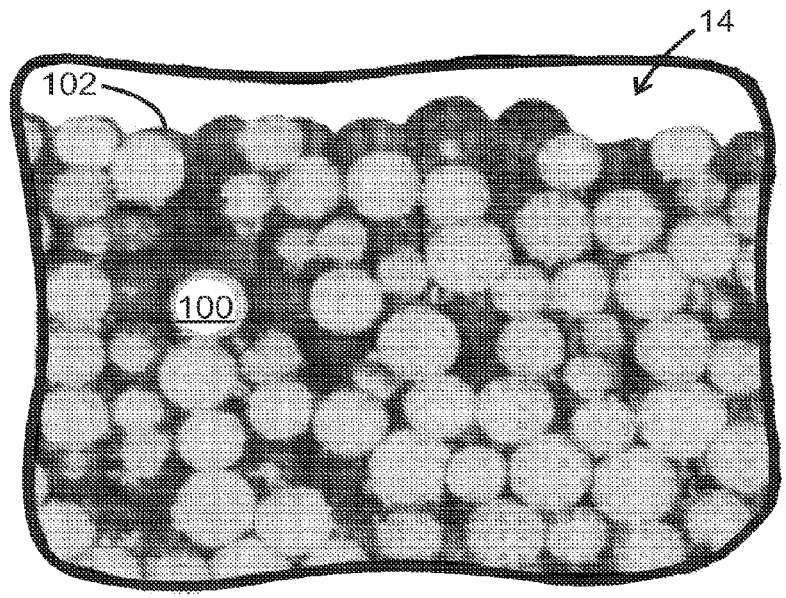
FIG. 10 is a cross-sectional view of a part of a known drainage slab with expanded granulates which in some areas are insufficiently packed.

In FIGS. 9A and 9B are shown examples of sought-after tight packing of expanded granulates 100 in a cross-sectional area of a drainage slab 14. Other configurations of a sought-after tight packing can also be found. A hardened bonding agent 102, such as a water soluble thermosetting adhesive, encloses the granulates 100, so that they become watertight. The hardened bonding agent 102, moreover, bonds the granulates 100 at their contact points. The resulting drainage element 14 thereby acquires a coherent, draining, heat-insulating and capillary-breaking cavity structure in the spaces between the granulates 100. FIG. 10 shows by way of comparison a cross-sectional area of a sawn-through drainage element 14 according to the prior art. As can be seen from the darker portions inside the cross-sectional area, the element 14 has an undesirably large cavity structure as a result of imperfect packing of the granulates 100 during the molding and compression of the element 14. A large cavity structure of this kind can give the drainage element 14 an altogether inadequate strength, in particular compressive strength.

As previously mentioned, it can be possible, in a manner which is not shown, also to arrange the cover 50 such that it can be raised and lowered, in order to possibly further improve the compression.

In FIG. 8 it is shown that during the compression a heated fluid, such as warm air, is brought to flow through the element 14 via perforations 52 in the mold bottom 44 and in a cover bottom 54 of the cover 50, in order to harden the bonding agent in the mold compound. For this purpose, the mold bottom 44 and the cover bottom 54 can also be formed of a grid structure (not shown). From a closed and expediently heat-insulated pipe system, the heated fluid can enter into each station 40 through inlet openings 48 and exit from each cover 50 through outlet openings 56. In a manner which is not shown, the stations 40 can also be integrated as a coherent elongated unit, through which the heated fluid can flow freely to each station and exit through the respective cover 50.

Once the bonding agent has hardened, the cover 50 can be swung back up into a vertical position indicated in FIG. 2. The axis 58 can be located at a distance somewhat above the stations 40, so that a raking member 82 of a pusher 80 can pass under the cover 50 and push away the finished drainage elements 14 from the plant 20 to a conveyor 90, such as a belt conveyor, for further handling, such as stacking and packaging of the elements 14.

The above-detailed description is primarily intended to facilitate understanding, and no unnecessary limitations of the invention should be inferred from this. The modifications which become apparent to a person skilled in the art when examining the description can be made without deviating from the inventive concept or from the scope of the following patent claims.

The invention claimed is:

1. A device for producing a porous hardenable drainage element from a molding compound of plastics granulate and a bonding agent, the device comprising:
   a ladle, for receiving the molding compound, closed off at a bottom by a movable mold bottom that is configured to be lowered into a mold,
   actuators for lowering the mold bottom downwards to transport part of the molding compound into the mold, and
   actuators for raising the mold bottom to a predetermined higher level for compressing the porous hardenable drainage element during a molding process,
   wherein the ladle and the mold are arranged for mutual lateral displacement to separate a molded element from a portion of remaining molding compound in the ladle.

2. The device of claim 1, wherein the mold has an opening cross section substantially consistent with a cross section of the ladle.

3. The device of claim 1, wherein an actuator is arranged to compress the porous hardenable drainage element by repeated raising and lowering of the mold bottom.

4. The device of claim 1, wherein a propeller is arranged for pressurizing the molding compound in the ladle.

5. A method for producing a porous hardenable drainage element from a molding compound of plastics granulate and a bonding agent, the method comprising:
   receiving the molding compound into a ladle closed off at a bottom by a movable mold bottom that is configured to be lowered into a mold,
   lowering the mold bottom downwards to transport part of the molding compound into the mold,
   separating a molded element from a portion of the molding compound remaining in the ladle by mutual lateral displacement of the mold and the ladle, and
   compressing the porous hardenable drainage element during a molding process by raising the mold bottom to a predetermined higher level.

6. The method of claim 5, further comprising compressing the porous hardenable drainage element by repeated raising and lowering the mold bottom.

7. The method of claim 5, further comprising pressurizing the molding compound in the ladle using a propeller.

8. The method of claim 5, further comprising placing a counterstay against the element at a top side of the mold and compressing the element in the mold by raising the mold bottom.

* * * * *